United States Patent [19]
Mahler

[11] 3,802,394
[45] Apr. 9, 1974

[54] STOCK FEEDING DEVICE

[76] Inventor: Albert J. Mahler, Rt. 1, Box 194-R, Vacherie, La. 70090

[22] Filed: Sept. 29, 1972

[21] Appl. No.: 293,584

[52] U.S. Cl............................... 119/51.5, 119/60
[51] Int. Cl.............................................. A01k 05/00
[58] Field of Search.............. 119/51.5, 58, 60, 51 R

[56] References Cited
UNITED STATES PATENTS

| 1,129,761 | 2/1915 | Towle | 119/60 |
| 1,234,349 | 7/1917 | Kohlmeier | 119/58 |
| 679,285 | 7/1901 | Allen | 119/51.5 |
| 2,158,094 | 5/1939 | Teske | 119/51 R |
| 911,674 | 2/1909 | Olsen | 119/51.5 X |
| 2,068,210 | 1/1937 | Walker | 119/51 R X |

Primary Examiner—James H. Czerwonky
Attorney, Agent, or Firm—Lewis R. Krieg

[57] ABSTRACT

Apparatus and method are disclosed for improved feeding horses, cattle, or other livestock. Hay or other fibrous fodder is received in a rotatable variable volume chamber bounded in part by a mesh wall. Means are provided for some compacting of the charge and biasing it toward the mesh having openings such that the stock will be able to grasp the fodder through the mesh according to need. Means are also provided to wet the fodder with a liquid food supplement or component, so that a dispensing of balanced rations is facilitated.

4 Claims, 8 Drawing Figures

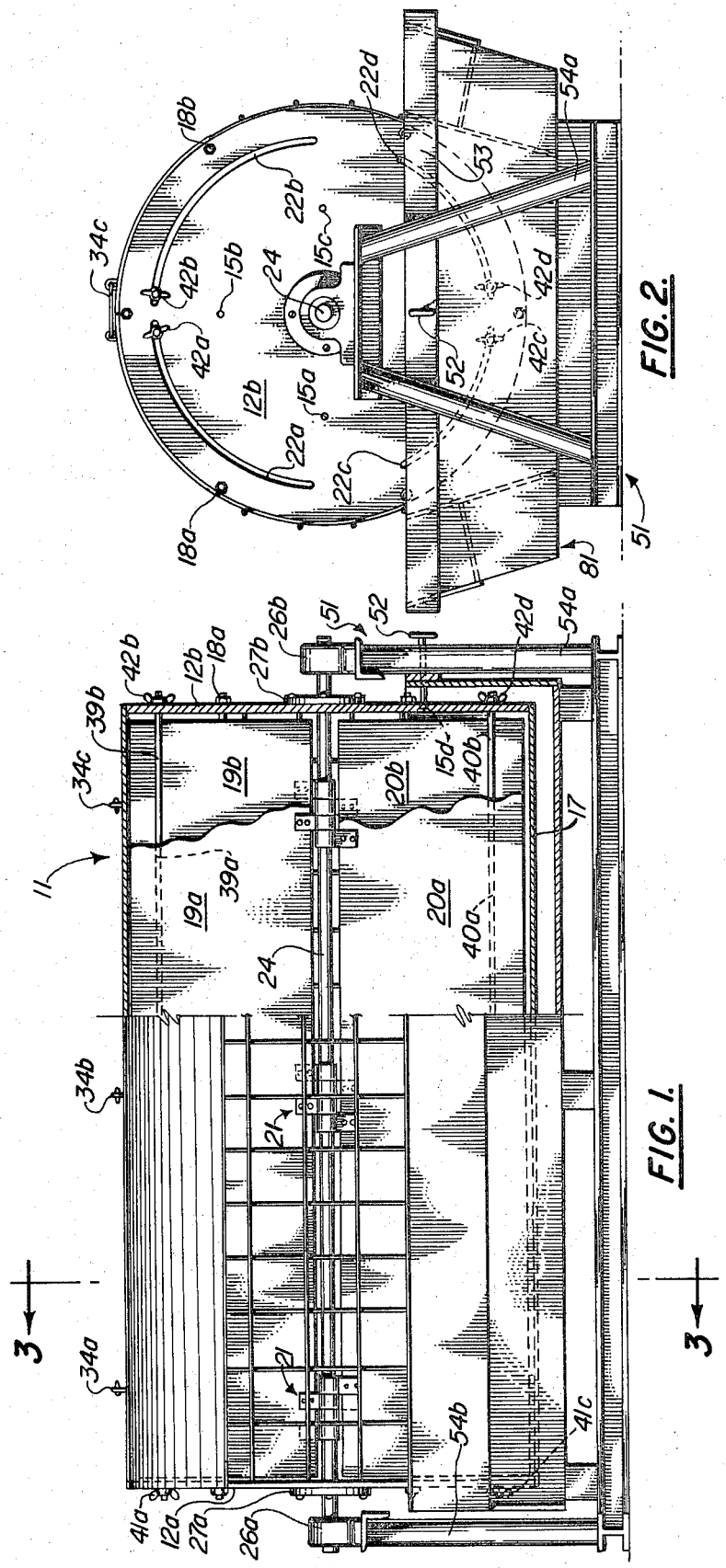

STOCK FEEDING DEVICE

BACKGROUND OF THE INVENTION

This invention is in the field of animal husbandry and, more specifically, deals with apparatus and a method of feeding livestock such as horses, cattle and other ruminants, and stock animals which feed on hay or other fibrous or grassy vegetable matter.

It is customary, expecially during the winter months, to feed pre-cut, dried, fodder to livestock. This feeding is of course necessitated when the stock cannot acquire sufficient food by normal grazing. Many farmers or ranchers provide the fodder to their stock by merely breading open wire tied bales in the open pasture. Occasionally, the baled fodder is opened under a field shed, which gives some protection against the weather.

In general, when the hay or other fodder is merely provided as a loose mass for the stock, large fractions get trampled and worked into the ground to an extent that it is not eaten by the stock. This is especially true when the ground is wet, or already trampled and cut up, as under a shed roof. Because of this type of loss, the effective utilization of fodder has frequently been quite low — say between 50 and 75 percent — because of the losses.

Dry fodder is only a partial segment of an animal's dietary needs, and for best results is frequently supplemented by other feed components. A frequent supplemental diet component is blackstrap molasses, which contains sugar and other valuable food components such as iron and other minerals. In practice, such molasses was usually provided for the stock in open tanks. In some cases, the molasses is poured on a mass of hay to provide a prepared mixture with both roughage (hay) and the food elements supplied by the molasses. Premixing of this type is rarely done, however, because of the tedium and labor involved. Consequently, in many instances, stock is not provided a supplemented diet even when it is desirable for optimum growth rate.

A need has therefore existed for improved apparatus and method for dispensing forage to livestock.

OBJECTS OF THE INVENTION

An object of the present invention is to provide a method and apparatus whereby dry, fibrous, fodder can be efficiently dispensed to consuming livestock. A more particular object is to provide a method and apparatus which avoids a large part of the waste heretofore encountered. An additional object is to provide a method and apparatus whereby a charge of fibrous fodder can be dispensed to stock only at determined periods, and can be kept unavailable but in a condition of readiness during periods when it is not desired to feed the stock. A further object of certain refined embodiments is to provide a mode and apparatus for dispensing roughage such as hay wetted with an appropriate amount of liquid food component such as black strap molasses or other liquid food material.

SUMMARY OF THE INVENTION

The apparatus of the invention, in its most general form, comprises a variable sized chamber for receiving the fibrous vegetative feed, a portion of the boundary wall of the chamber being in mesh form. The mesh thereof has openings which are sufficiently large so that livestock can obtain access by biting to secure the feed on the opposite side. Another boundary of the chamber is a movable wall which is at least limitedly movable toward the wall having mesh or similar openings. When such movement is accomplished and the chamber contains hay or similar grass-like fodder, it causes a compaction of the charge and an urging toward the mesh or feeding wall segment.

In preferred forms of the apparatus, the variable size chamber is in elongated form and is mounted for rotation on an axis of its elongated dimension. By this expedient, a load or charge of fodder can be prepared in condition for feeding, but can be rotated so that the feeding wall is inacessible to the stock, so that feeding can be deferred to the most effective time if desired.

The most preferred embodiments utilize two variable size chambers which are portions of a generally cylindrical enclosure. This structure admits feeding the stock in two ranks or stations, i.e., on both sides of the apparatus.

In certain forms of the invention provision is made for combining a liquid feed component with fibrous roughage fodder. In said embodiments, a storage or supply vessel or tank is provided and the rotatable chamber is rotated to pass the dry, fibrous material below the liquid surface to allow the liquid to wet the hay or other vegetation and adhere at least in part thereto. In this manner a feed supply including both the dry hay and the liquid feed material is prepared and dispensed to the stock.

The method of the invention comprises supplying a fibrous forage material to one side of a perforate or mesh barrier, having openings of sufficient size therein to permit feeding by the stock, and the urging of the forage material toward said barrier. Another aspect of the method is that the feed material prepared as indicated can be shifted to and from a position accessible to feeding whereby scheduled feeding periods are possible. In certain refined embodiments of the invention, the dry forage is immersed in or passed through a liquid feed material, and the fibers are thus wetted by such liquid feed. This variation provides a method of conveniently offering material to the stock.

FIGURES ILLUSTRATING THE INVENTION

The details of a specific embodiment of the invention, its construction and mode of operation, are described later herein with reference to the accompanying figures, which include FIG. 1, a side elevation, FIG. 2, an end elevation, FIG. 3, a transverse sectional elevation showing the general arrangement of the internal structure, and FIG. 4, illustrating typical means for securing a partition or wall segment.

In addition, FIGS. 5, 6, 7 and 8 are schematic representations showing the utilization of the apparatus at the various stages in carrying out the operational method.

DETAILED DESCRIPTION

Figure 3:
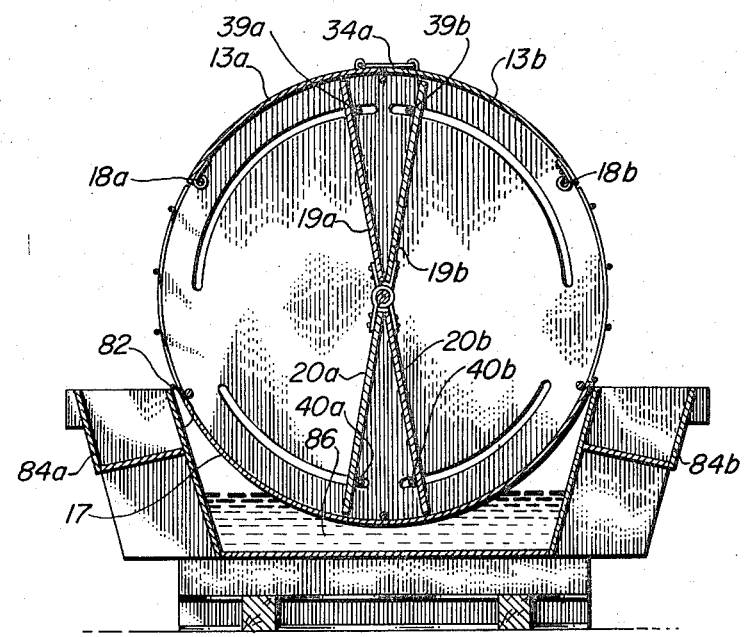

Referring to FIG. 1, a side elevation is shown of the apparatus, the major components being a rotatable assembly 11 mounted on a frame assembly 51, which also supports a tray assembly 81. The rotatable assembly 11 is now described and concurrent reference to FIG. 2, an end elevation view of the apparatus, will be useful.

In this embodiment, two variable size feed chambers are provided in the rotatable assembly 11 which is in this instance in the form of an elongated cylinder, this configuration permitting feeding to be accomplished from both sides of the apparatus. It will be evident that comparable structure can be provided having only a single variable volume chamber which admits of feeding stock from one side only.

The rotatable cylinder assembly 11 includes circular end plates 12a, 12b, and surface segments fitted to the end plates and defining the cylindrical shape. The surface segments include charging doors 13a, 13b and two sections 16a, 16b which are formed of very coarse wire or rod mesh, and, lastly a closed side section 17.

The charging doors 13a, 13b are curved to fit the margins of the circular end plates and are hinged by means not shown to tie rods 18a, 18b which are securely fastened at each end to the end plates 12a, 12b.

The entire cylinder assembly 11 is supported on a centrally positioned axle 24 running the entire length and through the end plates 12a, 12b. The axle 24 projects outwardly past the end plates so that each end can be supported in bearings 26a, 26b, supported by the frame 51 as hereinafter described. The axle 24 in this design rotates with the drum assembly, being secured to the end plates 12a, 12b by boss plates 27a, 27b.

Figure 4:
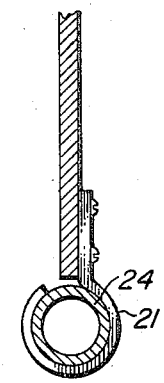

Within the cylinder are four vanes 19a, 19b, 20a, 20b. These are rectangular partitions each approximately one-half the width of a plane bisecting the cylinder. The partitions are made slightly smaller than the space available so that adequate clearance is provided, to permit easy movement as discussed later herein. The partitions are desirably made of solid material. In certain instances, the partition can be a relatively fine woven metal screen. All that is required is that the partition be essentially impervious to the dry fodder to be employed. Each partition is secured to the axle 24 by several of a series 21 of bent metal straps as hinge means. An individual strap hinge connection is illustrated by FIG. 4.

It is seen (FIG. 3) that two variable sized chambers are defined within the cylinder, said chambers being illustrated in approximately maximum dimension in FIG. 3. Thus partitions 19a, 20a, charging door 13a, mesh wall 16a and part of the wall 17 form a left hand chamber. Similarly, partitions 19b, 20b, charging door 13b, mesh section 16b, and part of the wall 17 form a right hand chamber.

Each of the partition members is desirably provided with an attached reinforcing rod member near the outer edge, as for example the rods 39a, 40a near the edges of partitions 19a, 20a. The ends of reinforcing rods project through arcuate slots in each of the end plates 12a, 12b, as shown for example by slots 22a, 22b, 22c, 22d, in end plate 12b. The end of each rod is threaded, so that the radial disposition of the partitions can be fixed by tightening wing nuts 42a, 42b, 42c, 42d, (see FIGS. 1 and 2) threaded thereon.

Catches or closing hooks 34a, 34b, 34c are provided to secure the charging doors 13a, 13b in a closed position as required, as illustrated in FIG. 1 and FIG. 2.

The tray structure 81 already mentioned includes a main supply tray 82 and a catch tray 84a, 84b on each side. From several of the figures it is seen that the main supply tray 82 is proportioned so that a segment of the drum periphery can be readily immersed in a liquid charge in the tray.

The frame 51 can include a spring-loaded stop pin 52 mounted through a crosspiece 53 on one end support 54a of the frame assembly. The stop pin 52 in its normal position will fit in to any of the series of holes 15a, 15b, 15c, 15d in the end plate 12d. Such registration will assure that the cylinder assembly will not be accidentally rotated. When the pin is retracted, the cylinder assembly 11 can be easily rotated. Means not shown can be provided to maintain the stop pin 52 in a retracted position as a convenience during operation as described hereinafter.

The materials of construction used for the apparatus are not particularly critical and a wide latitude of choice exists, so that local preferences or economics can prevail. Typical construction materials include, illustratively, plywood for the end plates 12a, 12b, and for the partitions or vanes 19a, 19b, 20a, 20b; sheet aluminum for the charging doors 13a, 13b and the closed side section 17. The frame structure 51 can be readily fabricated of timbers, or of welded steel tubular sections.

Similarly to the choice on materials, the dimensions are not particularly critical. In a typical installation, principal dimensions are in the range of length of cylinder 6 to 10 ft.
diameter 3 to 5 ft.
tray depth about 1.5 ft.
center line elevation about 4 ft.

With respect to the feeding wall of each chamber, the preferred size of openings will be squares of approximately 8 inch size. It will be understood that, instead of a coarse wire or metal rod mesh, an appropriate feeding surface can be provided by holes of proper size cut out of thin sheet material such as plastic, thin plywood, or sheet metal. Care must be taken, however, to avoid sharp edges which might cause discomfort or injury to the stock while feeding.

In some instances, it will be preferred to house the apparatus in a fixed position as a more-or-less permanent installation. In other cases, it will be found desirable to provide wheels so that the apparatus can be transported from one area to another.

Further details of construction of the apparatus will be clear from a description of the method of the invention applied to the particular apparatus illustrated. In general, the first step is the charging of hay or other fibrous fodder to a variable size zone, in maximum volume configuration, having one boundary which is a feeding surface, with mesh apertures being large enough to permit stock to grasp the fodder with their teeth and extract as desired. Upon loading, the charging doors 13a, 13b are closed and fastened shut.

The next step is the reduction in size of the charged zone accompanied by corresponding compaction of the feed charge with resulting biasing toward the mesh boundary. A final step is the presentation of the mesh boundary to a feeding position for the stock. In a preferred sequence, the loaded and compacted feed is exposed at least in part to wetting with a liquid food component by passing the mesh boundary through the liquid feed component supply. In this fashion a layer of the feed is wetted so that the stock is given the opportunity of feeding dry fodder plus a liquid supplement at one time.

As heretofore memtioned, a common liquid feed component is blackstrap molasses, but various commercial preparations are also known, for example, the feed liquid "Compensator" available from Allied Chemical Co. Another commercially available product is the liquid feed designated as "Pro-lic."

Figure 5:
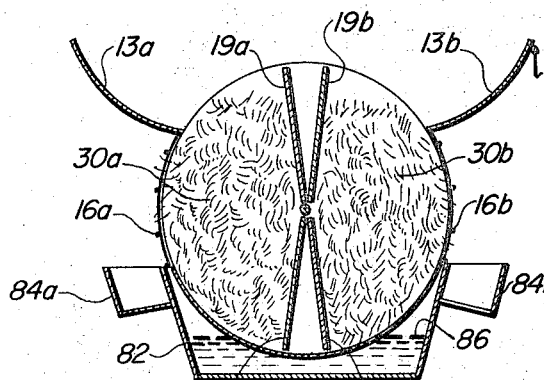

FIGS. 5–8 are schematic diagrams illustrating the operational steps outlined above as carried out in the apparatus structurally described above. In FIG. 5, the apparatus is indicated with the loading doors 13a, 13b swung open, and with the two pairs of the partitions 19a, 20a and 19b, 20b oriented in approximately vertical positions. It is thus seen that compartments of the maximum size are established on each side of the drum, for the reception of loose fodder. The compartments, are shown after filling with loose fodder, which is added from the top.

Both sides are filled and the loading doors 13a, 13b are swung to and fastened.

Figure 6:
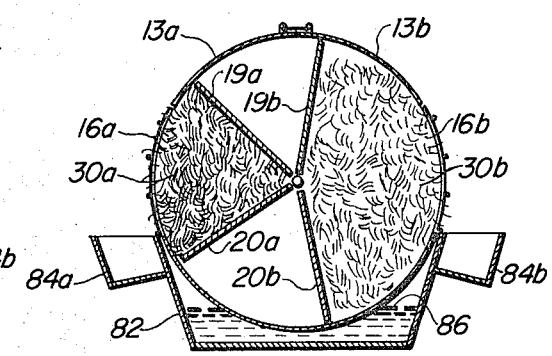

In FIG. 6, the loaded apparatus is shown with both compartments fully charged and the compacting step accomplished for the left compartment. The compacting step is accomplished by swinging the vanes of each pair toward each other. Thus, as shown, the vanes 19a, 20a defining the left compartment have each been swung approximately 40° toward each other, and as a result, the fodder charge 30a in the left side has been compacted and concurrently urged or biased toward the mesh boundary 16a.

The fodder charge 30b in the right compartment is shown in FIG. 6, immediately after the loading, but before it has been compacted by movement of the vanes 19b, 20b establishing in part the right zone.

The adjustment of positions of the partitions for the compacting operation is readily accomplished by loosening the wing nuts threaded on the rod ends projecting outside the end plates and shifting the partition ends along the arcuate slots in the end plates, and, of course, tightening the wing nuts in the new position attained. The degree of movement readily attainable is not precise and depends on the degree of looseness of the freshly charged fodder. In some instances, only a small degree of movement is convenient, when the hay or other fodder has been relatively tightly charged initially, so that a lower degree of compaction is possible.

Figure 7:
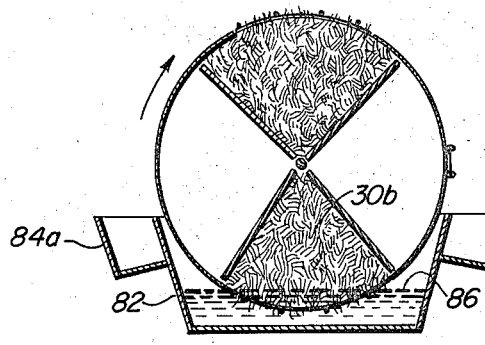

In FIG. 7, the apparatus is shown during the step of wetting a layer of the compacted right hand charge 30b with a liquid food component. The wetting of this charge is accomplished by rotating the entire drum to position the mesh boundary 16b below the liquid surface 86 in the main tray 82. This permits at least the outer portion of the charge 30b to be wetted with the liquid. It will be evident that the amount of the dry fodder which is wetted by the liquid feed will be influenced by several factors. The degree of immersion can be varied by the quantity of liquid food material in the tray 82, which of course varies the liquid level 86. Also, the time of exposure is a factor, in that a longer period will assure that the liquid will migrate to or contact with the dry material at an elevation corresponding to the liquid level.

Figure 8:
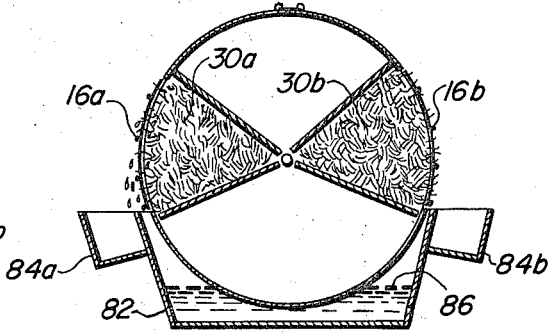

The dispensing operation is indicated by FIG. 8. In this position the drum assembly has been rotated so that the mesh boundaries 16a, 16b are positioned again at the sides of the apparatus, generally above the catch trays 84a, 84b.

In the feeding or dispensing operation of FIG. 8, the stock can reach through the mesh segments to grasp and extract the hay. It is found that the stock extracts essentially only the material being consumed. Short fibers dropped by the cattle in this feeding operation will be collected in the catch trays 84a, 84b and can be readily recollected at appropriate intervals and charged back to the apparatus, thus essentially eliminating any feed losses.

When desired, only dry fodder can be dispensed, by merely eliminating the step of wetting a charge in the liquid food component. Alternatively, it may be desired to apply the liquid food component to a larger proportion of a given charge than is accomplished by immersing only a portion thereof, as in FIG. 7. In such instances, after a charge has been thus wetted in part, the drum assembly is rotated 180°, so that the wetted layer is at the top of the apparatus, and surplus liquid will drain by gravity toward the interior of the compacted charge. An immersion and such a draining sequence will increase the proportions of liquid.

In the course of the stock extracting small, mouthsize portions through the mesh, additional feed will be pulled toward the mesh boundary as a result of two factors. One factor is the result of the intermeshing of the extracted strands or fibers, so that the extracted portion pulls out portions from the interior. A second factor is the result of the compaction, so that springy, compressed interiorly positioned material tends to expand toward the mesh wall.

The apparatus can be utilized in still another manner, i.e., to offer limited quantities of solely liquid food material to the stock. To accomplish this, the cylinder assembly is rotated optionally without any dry fodder charge, so that the non-perforate cylinder surfaces (viz., the charging doors 13a, 13b and the closed side 17) are wetted. Then, these surfaces are presented in the feed position so the cattle can lick the liquid from the exterior surfaces.

It will be evident that particular details, of construction and of the method of operation, will be susceptible to numerous variations within the scope of the appended claims.

What I claim is:

1. Apparatus for dispensing fibrous vegetation feed to stock comprising a support structure and an axle supported thereby, a variable sized chamber having boundaries including a cylindrical portion and being rotatably supported by said axle at the axis of the said cylindrical portion, said variable sized chamber having a closable charging door mounted in a boundary thereof, the chamber having two end walls and peripheral walls extending between the end walls and farming said cylindrical portion, the cylindrical portion comprising i a perforated segment with openings sufficiently large for stock to bite through to secure fibrous feed in the chamber adjacent the segment, and ii at least one solid segment, and longitudinally oriented solid walls mounted on and extending substantially radially from the axle to the cylindrical portion, at least one of the solid walls being pivotable at the axle whereby the size of the chamber is alterable and a charge of fibrous vegetation feed filling the chamber at a large size would be compacted and biased toward the perforated segment by pivoting of the pivotable wall to reduce the chamber size.

2. Apparatus for dispensing fibrous vegetation feed to stock comprising a rotatable assembly, a liquid tight tray having an open top, and a support structure for said rotatable assembly and said tray, the rotatable assembly including a variable sized chamber having a closable charging door mounted in a boundary thereof, the chamber having two end walls and peripheral walls connecting the end walls and forming a cylindrical portion, the rotatable assembly being supported on an axle mounted at the axis of the cylindrical portion, the cylindrical portion comprising i a perforated segment with openings sufficiently large for stock to bite through to secure fibrous feed in the chamber adjacent the segment, and ii at least one solid segment, and longitudinally oriented solid walls mounted on and extending substantially radially from the axle to the cylindrical portion, at least one of said solid walls being pivotable at the axle whereby the size of the chamber is alterable and a charge of fibrous vegetation filling the chamber at a large size would be compacted and biased toward the perforated segment by pivoting of the pivotable wall to reduce the chamber size, the tray being supported below the rotatable assembly at an elevation such that a liquid in the tray will contact fibrous vegetation within the rotatable assembly chamber when it is pivoted to position the perforated segment within said tray.

3. The apparatus of claim 2 wherein the rotatable assembly includes two said variable sized chambers, the perforated segments of the cylindrical portion walls of each being oppositely positioned, a solid segment being provided on each side of each perforated segment, and both of the solid walls extending from the axle for each chamber are pivotable at the axle.

4. A method for preparing and dispensing feed to stock which feed includes fibrous vegetation material and a liquid component, comprising charging dry fibrous vegetation in a variable sized container having boundaries including a perforated wall feeding portion with openings therein sufficiently large for the stock to bite through to secure fibrous matter in the chamber adjacent the wall, compressing and outwardly biasing the vegetation material in said container and toward the said perforated wall feeding portion, rotatingly moving the container and the vegetation feed therein to contact at least part of the fibrous vegetation feed with a liquid feed material means whereby some of the liquid feed material adheres to the fibrous vegetation feed on removal from contact, removing from said contact and thereafter positioning the perforated wall feeding portion for stock feeding.

* * * * *